Patented June 10, 1947

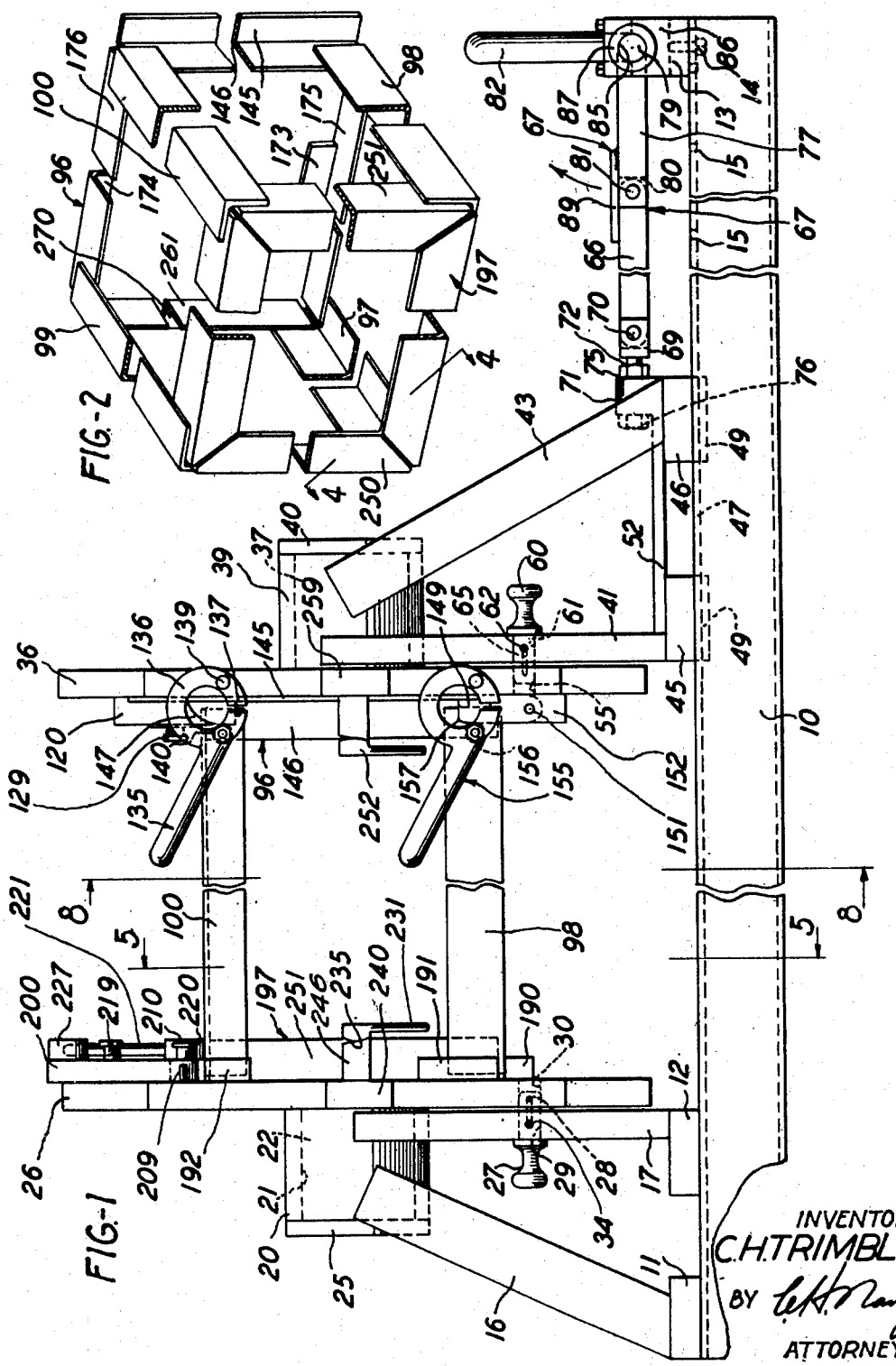

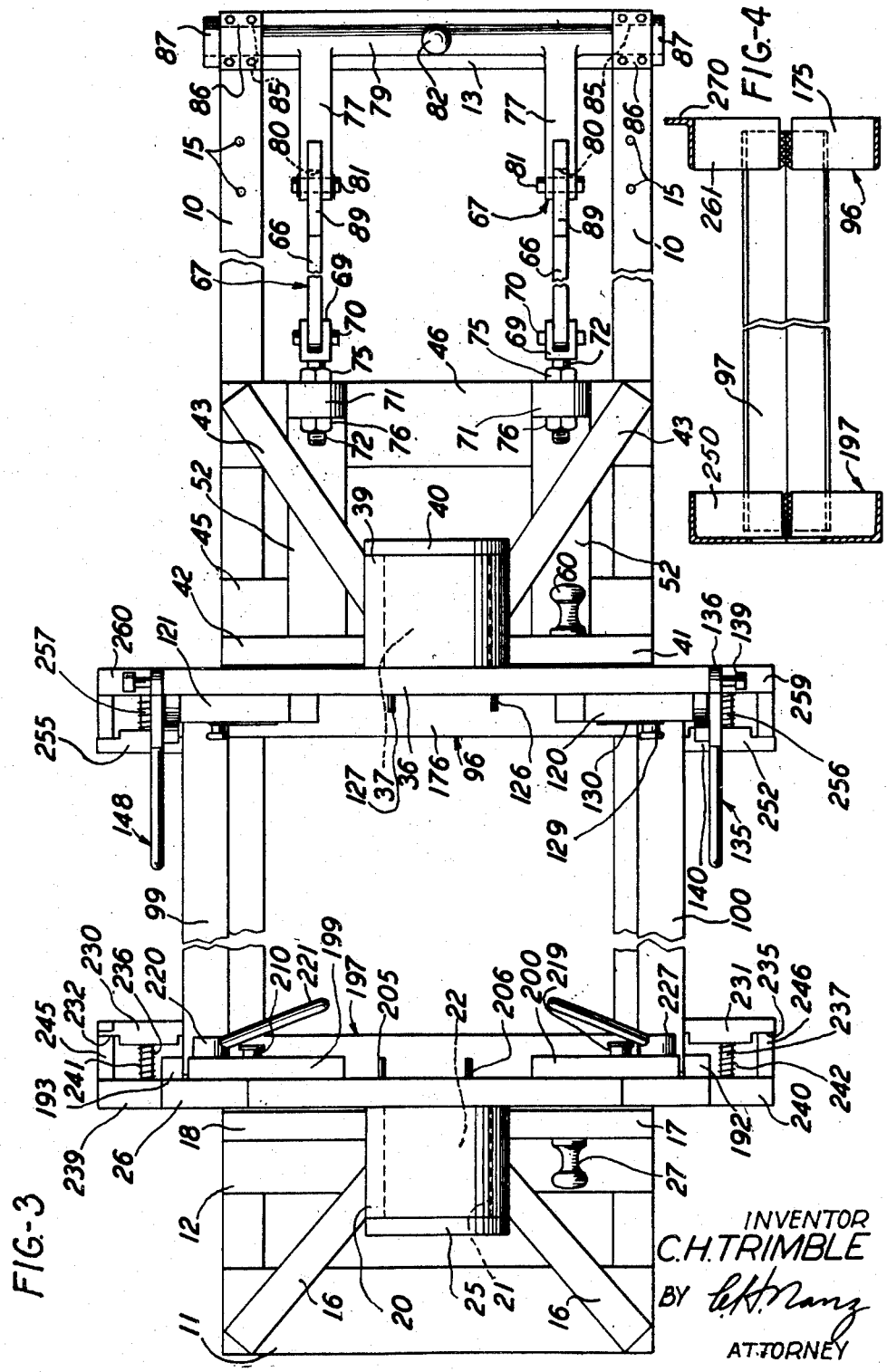

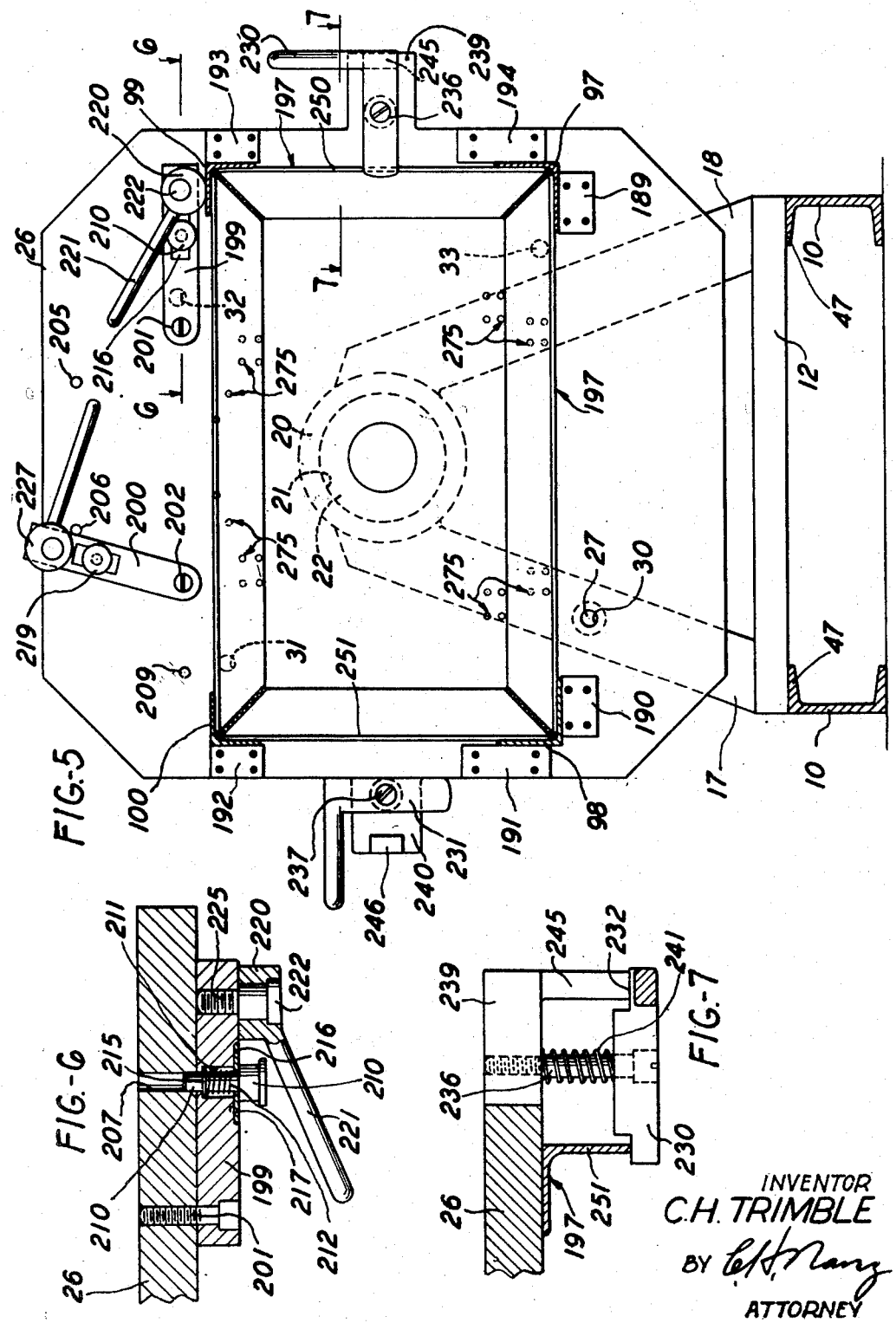

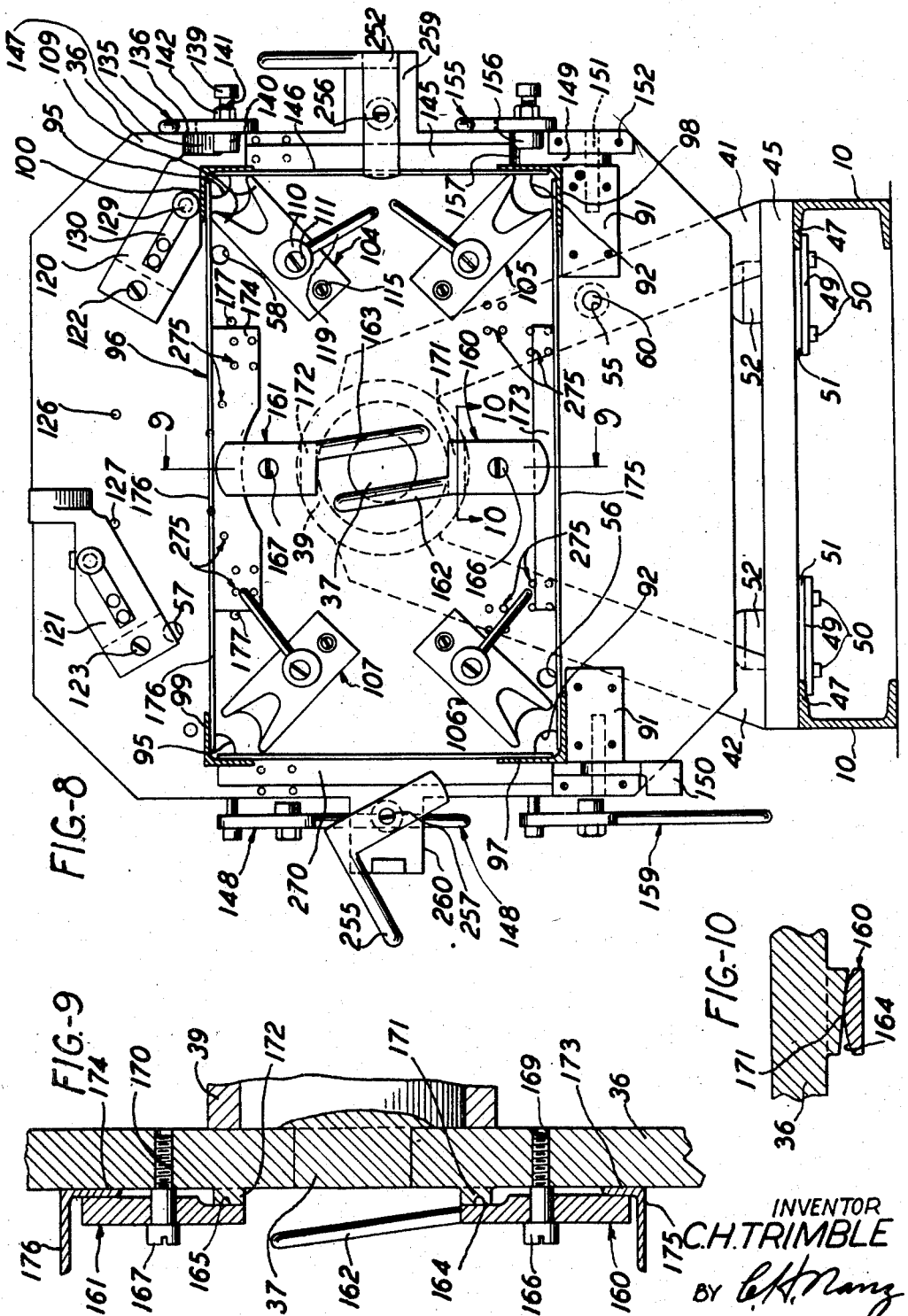

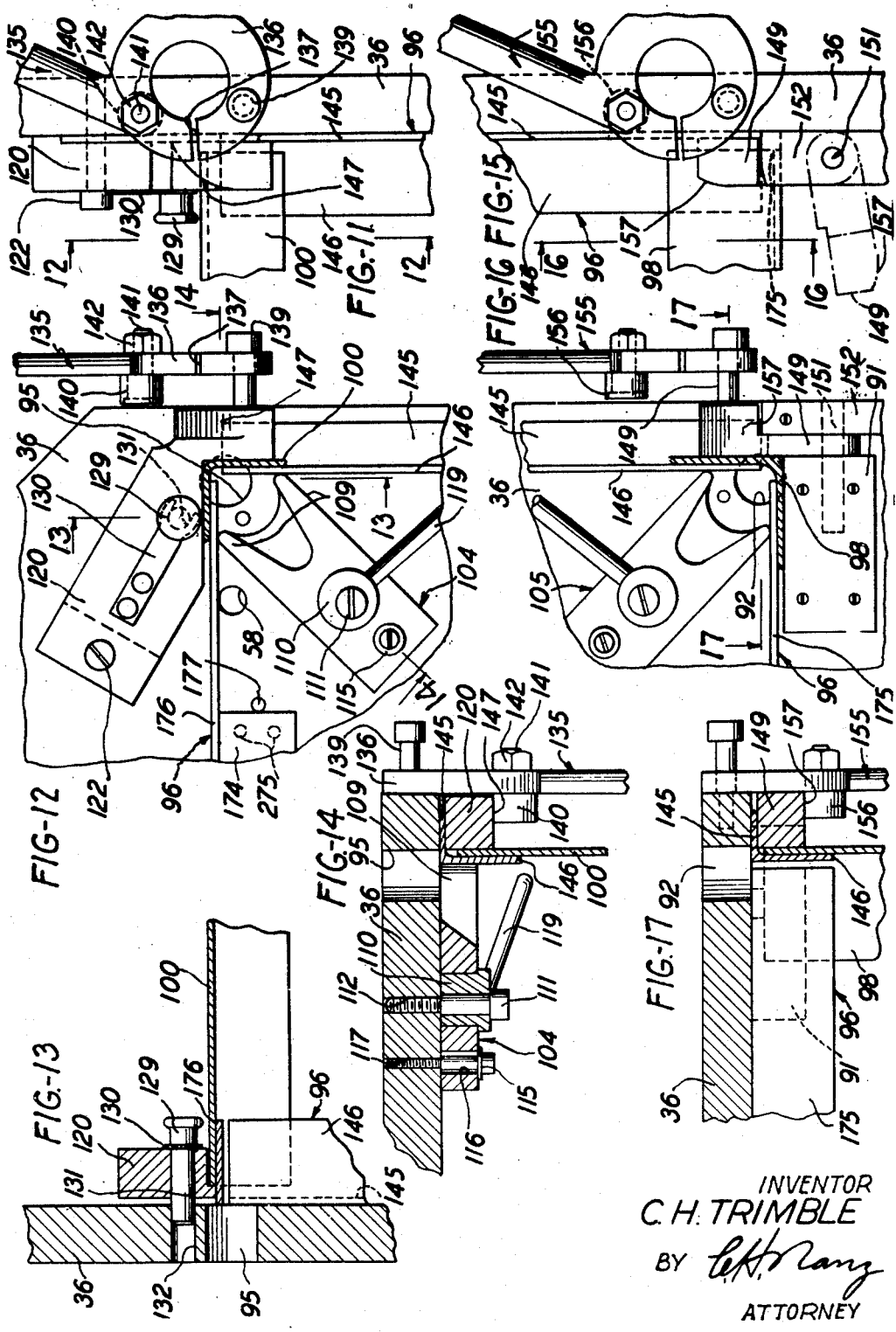

2,421,973

UNITED STATES PATENT OFFICE 2,421,973

ARTICLE ASSEMBLING FIXTURE

Charles H. Trimble, Baltimore, Md., assignor to Western Electric Company, Incorporated, New York, N. Y., a corporation of New York Application October 19, 1943, Serial No. 506,854

11 Claims. (Cl. 113—99)

This invention relates to article assembling fixtures and more particularly to fixtures for holding each of several parts to be welded together in a predetermined relationship to the other parts while they are being welded.

In the manufacture of box-like frames out of angle irons it is necessary to hold each angle iron in a predetermined relationship to the other angle irons forming the frame during the welding operation. When a large number of angle irons are to be welded to assemble one structure, it is desirable to provide a fixture to hold the several angle irons in their proper relations while they are being welded to one another.

An object of this invention is to provide a new and improved article assembling fixture.

One fixture embodying the invention comprises an elongated base, a pair of vertical supports one of which is slidably mounted on the base, a toggle-joint linkage for moving the slidable support and locking it in a predetermined position, a turntable carried by each of the supports, clamping means for securing the supports in predetermined positions, clamping means for securing frame members to the turntables, means for adjusting the relative positions of some of the elements of the fixture to accommodate frame members of varying sizes, and means for affixing different types of clamping means to the turntables for different types of frame members.

Other features and advantages of the invention will become apparent from the following detailed description of a specific embodiment of the invention, when read in conjunction with the accompanying drawings, in which:

Fig. 1 is a fragmentary front elevation of a fixture embodying the invention;

Fig. 2 is a fragmentary perspective view of a box-like frame of the type which is welded together while held in the fixture shown in Fig. 1;

Fig. 3 is a top plan view of the fixture shown in Fig. 1;

Fig. 4 is a sectional view of the frame taken along the line 4—4 of Fig. 2.

Fig. 5 is a partial sectional view of the fixture taken along the line 5—5 of Fig. 1;

Fig. 6 is an enlarged, fragmentary sectional view taken along the line 6—6 of Fig. 5;

Fig. 7 is an enlarged, fragmentary sectional view taken along the line 7—7 of Fig. 5;

Fig. 8 is a partial sectional view of the fixture taken along the line 8—8 of Fig. 1;

Fig. 9 is an enlarged, fragmentary sectional view of the fixture taken along the line 9—9 of Fig. 8;

Fig. 10 is an enlarged, fragmentary sectional view of the fixture taken along the line 10—10 of Fig. 8;

Fig. 11 is an enlarged, fragmentary, front elevational view of a portion of the fixture;

Fig. 12 is a fragmentary sectional view taken along the line 12—12 of Fig. 11;

Fig. 13 is a fragmentary sectional view taken along the line 13—13 of Fig. 12;

Fig. 14 is a fragmentary sectional view taken along the line 14—14 of Fig. 12;

Fig. 15 is an enlarged fragmentary front elevational view of a portion of the fixture;

Fig. 16 is a fragmentary sectional view taken along the line 16—16 of Fig. 15, and Fig. 17 is a fragmentary sectional view taken along the line 17—17 of Fig. 16.

Referring now to the drawings, a pair of channels 10—10 are secured in parallel arrangement by cross-bars 11 and 12 and a cross-bar 13 secured to each of the channels 10—10. The cross-bar 13 may be selectively secured to the channels in any of several positions different distances from the ends of the channels by bolts such as the bolt 14 passing through bores 15—15 in the channels. Supports 16—16 secured to the cross-bar 11 and inclined braces 17 and 18 secured to the cross-bar 12 are welded to and support a bearing 20 having a passage 21 formed therethrough. A shaft 22 having a flange 25 formed on one end and a turntable 26 secured upon the other end thereof, passes through the passage 21 in the bearing 20, whereby the turntable 26 is rotatably mounted with respect to the channels 10—10. A plunger 27 having a keyway 28 formed therein is mounted slidably in a bore 29 formed in the member 17 and is adapted to be inserted into any of four apertures 30, 31, 32 and 33 (Fig. 5) formed in the turntable 26 on equal perpendicular radii from the axis of the shaft 22. A key 34 projects into the keyway 28 to prevent the plunger from falling out of the bore 29. Thus, the turntable 26 may be selectively secured in any of four positions.

A second turntable 36 is affixed to a shaft 37 which is mounted in a bearing 39 and which has a flange 40 on the outer end thereof to secure the shaft in the bearing. Supports 41 and 42 and inclined braces 43—43 secured to and supporting the bearing 39 are secured to cross-bars 45 and 46, respectively. The cross-bars 45 and 46 are slidably secured upon upper flanges 47—47 of the channels 10—10 (Fig. 8) by overlapping plates 49—49 secured to the cross-bars 45 and 46 beneath spacer plates 51—51 by bolts 50—50 which pass through apertures in the plates 49—49 and 51—51. Spacers 52—52 are secured to the cross-bars 45 and 46 to rigidly hold the cross-bars 45 and 46 in their respective positions.

The turntable 36 has four apertures 55, 56, 57 and 58 formed therein upon equal perpendicular radii from the axis of the shaft 37 and is thereby adapted to be selectively secured in any of four positions by a plunger 60. The plunger 60 is slidably mounted in a bore 61 formed in the member 41 and is retained therein by a key 62 projecting into a slot 65 formed in the plunger.

Links 66—66 of toggle-mechanisms 67—67 are pivotally secured by pins 70—70 to brackets 69—69 which are adjustably and rigidly secured by means of threaded bolts 72—72 attached to the brackets and nuts 75—75 and 76—76 threaded thereon to lugs 71—71 formed on the spacers 52—52. The links 66—66 are pivotally secured by means of pins 81—81 in slots 80—80 formed in arms 77—77 projecting from a shaft 79. A handle 82 is secured to the shaft 79 for rotating the shaft in aligned apertures 85—85 in bearings 86—86 formed at each end of the cross-bar 13. The shaft 79 has flanges 87—87 formed on the ends thereof to prevent axial movement thereof. Latches 89—89 are welded to the arms 77—77 and serve to latch the toggle-mechanisms 67—67 in the position shown in Fig. 1.

Stops 91—91 are bolted to the inner face of the turntable 36 at the two lower corners thereof as seen in Fig. 8 adjacent to apertures 92—92 formed in the turntable. Two similar apertures 95—95 are formed in the two upper corners of the turntable 36 and form with the two first-mentioned apertures the corners of a rectangle of the exact shape of the assembled form of an unassembled end frame 96 of the box-like frame shown in Fig. 2, which is to be assembled in the fixture. The corners of end frame 96 are positioned over the apertures 92—92 and 95—95 and the ends of side angle irons 97, 98, 99 and 100 which are to be welded thereto are also placed over these apertures.

Thrust members 104, 105, 106 and 107 are positioned so as to bisect the angles of the end frame 96 (Fig. 8). The thrust members are similar, and, for simplicity, only the thrust member 104 will be described in detail. Two fingers 109—109 (Fig. 12) are formed on one end of the thrust member 104, which is slidably secured upon the face of the turntable 36 by a cylindrical cam 110 (Figs. 12 and 14) eccentrically mounted on the face of the turntable 36 by a bolt 111. The bolt 111 is secured in an aperture 112 formed in the turntable and a flanged bolt 115 passes loosely through an enlarged aperture 116 formed in the thrust member 104 and into a threaded aperture 117 formed in the turntable. A handle 119 is formed on the cam 110 for rotating the cam, and, as the cam is eccentrically mounted, when the cam is rotated it forces the thrust member 102 toward or from the aperture 95, the bolt 115 preventing excessive lateral disalignment of the thrust member 102 but permitting longitudinal movement thereof during such sliding.

Clamps 120 and 121 (Fig. 8) mounted on pins 122 and 123, respectively, secured to the turntable 36 are freely pivoted on the face of the turntable and are limited by stop pins 126 and 127, respectively. The clamps 120 and 121 are identical in structure and principle of operation and, for simplification, only the clamp 120 will be described. A plunger 129 (Figs. 11, 12 and 13) secured to a leaf spring 130 is retained in a bore 131 formed in the clamp 120 and is adapted to be pressed into a bore 132 formed in the turntable when the clamp 120 has been swung to its clamping position, as shown in Figs. 8 and 12, to retain the clamp 120 in that position so that it bears against both flanges of the angle iron 100.

A lever 135 (Figs. 1 and 11) having an annular portion 136 provided with a slot 137 formed therein to give the lever resilience is pivotally and slidably mounted on a bolt 139 projecting from one edge of the turntable 36. A roller 140 is rotatably mounted upon a bolt 141 secured to the annular portion 136 of the lever 135 by a nut 142. When the lever 135 has been pivoted counterclockwise, as viewed in Fig. 11, to clear the roller 140 from the edge of the turntable 36, the lever is slid to the left on the bolt 139, as viewed in Fig. 12. It then may be further rotated to resiliently force the clamp 120 against the adjacent end of an outwardly projecting flange 145 of an angle iron 146, an unassembled part of the end frame 96, by the action of the roller 140 riding on a cam surface 147 formed on the member 120 and thereby force the adjacent end of the flange 145 firmly against the face of the turntable 36. The lever 135 may be retained in this position by the pressure between the roller 140 and the cam surface 147. A lever 148 (Fig. 8) is identical with the lever 135 and cooperates with the clamp 121 in the same manner that the lever 135 cooperates with the clamp 120.

Clamps 149 and 150 (Fig. 8) are provided at the lower end of the turntable 36, and, since they are identical, only the clamp 149 will be described. The clamp 149 is pivotally mounted upon a pin 151 passing into and between one of the stops 91—91 and a lug 152 attached to the turntable 36. When the clamp 149 is in the full line position, as viewed in Fig. 15, a lever 155, which is identical in construction with the lever 135, may be rotated so that a roller 156 mounted thereon bears against a cam surface 157 formed on the clamp 149 to force the adjacent end of the flange 145 against the turntable 36. An identical lever 159 (Fig. 8) is provided for similar cooperation with the clamp 150.

Clamps 160 and 161 having handles 162 and 163 and cam surfaces 164 and 165 (Figs. 8, 9 and 10) formed thereon are pivoted loosely on bolts 166 and 167 threaded into threaded apertures 169 and 170 formed in the turntable 36. When the clamps 160 and 161 are rotated by means of the handles 162 and 163 to the positions shown in Fig. 8 of the drawings, the cam surfaces 164 and 165 slide on wedges 171 and 172 (Figs. 9 and 10, respectively) welded to the turntable 36 to force the ends of the clamps 160 and 161 opposite to the handles toward the turntable 36 to firmly clamp flanges 173 and 174 of unassembled angle irons 175 and 176, respectively, against the surface of the turntable. Pins 177—177 (Fig. 8) carried by the turntable 36, bear against the ends of the flange 176 to center it therebetween.

Stops 189, 190, 191, 192, 193 and 194 (Fig. 5) secured to the face of the turntable 26 are adapted to support the angle irons 97, 98, 99 and 100 with a preassembled end frame 197 positioned snugly therebetween. A pair of identical clamps 199 and 200 are pivotally mounted on bolts 201 and 202 threaded into bores in the turntable 26 and may be swung between pins 205 and 206 secured to the turntable and apertures 207 and 209 formed in the turntable. When the stop 199 is in the position shown in Fig. 5, a pin 210 positioned in an aperture 211 (Fig. 6) formed in the clamp 199 is pressed into the aperture 207 by a coil spring 212 compressed between a collar 215 secured on the pin 210 and a plate 216 inserted in an aperture 217 formed in the clamp 199 to retain the clamp in the position shown in Fig. 5. A pin 219 similarly mounted in the clamp 200 performs a similar function with regard to the clamp 200 and the aperture 209.

An eccentric cam 220 having a handle 221 is rotatably mounted on a flanged bolt 222 (Fig. 6) threaded into a bore 225 formed in the clamp 199. When the cam 220 is rotated to the position shown in Fig. 5, it bears against the angle iron 99 to compress the angle irons 99 and 97 and the end frame 197 positioned between the angle irons 99 and 97 firmly between it and the stop 189. A similar eccentric cam 227 similarly mounted on the clamp 200 is adapted to perform a similar function with respect to the stop 190 to compress the angle irons 98 and 100 and the left side of the end frame 197 positioned therebetween, after the clamp 200 has been placed in its clamping position.

Levers 230 and 231 having cam surfaces 232 (Fig. 7) and 235 (Fig. 1), respectively, formed thereon are slidably and pivotally mounted on pins 236 and 237 fastened in projections 239 and 240, respectively, on the turntable 26. A spring 241 (Fig. 7) positioned on the pin 236 urges the lever 230 against the head of the pin 236 and a similar spring 242 (Fig. 3) acts in the same manner upon the lever 231. When the levers 230 and 231 are turned from the position shown by the lever 231 in Fig. 5 to that illustrated by the lever 230 in Fig. 5, the cam surfaces 232 and 235 bear against wedges 245 and 246 on the projections 239 and 240 to force angle irons 250 and 251, respectively, forming parts of the end frame 197, firmly against the surface of the turntable 26.

Levers 252 and 255 (Fig. 3) pivotally mounted on bolts 256 and 257 fixed to extensions 259 and 260 on the turntable 36 are similar to the levers 230 and 231 just described, and the other features of the construction of the projections 259 and 260 are like those of the projections 239 and 240. The levers 252 and 255 are adapted to firmly press angle irons 146 and 261, respectively, which are unassembled parts of the end frame 96, against the surface of the turntable 36.

To assemble the box-like frame (Fig. 2) the turntable 36 is locked in one of the four fixed positions, such as the position shown in Fig. 1. The thrust members 104, 105, 106 and 107, clamps 120 and 121, clamps 149 and 150, clamps 160 and 161, and the levers 252 and 255 of the turntable 36 are withdrawn to their open or unclamping positions as are the clamps 199 and 200 and the levers 230 and 231 of the turntable 26.

One end of each of the angle irons 97 and 98 is placed upon one of the stops 91—91 on the turntable 36 and the other ends thereof are placed upon the stops 189 and 190 and against the stops 194 and 191, respectively, on the turntable 26. The ends of the angle irons 97 and 98 are thus properly placed with respect to the turntables.

The end frame 197 is then placed upon the ends of the angle irons 97 and 98 and is clamped firmly against the face of the turntable 26 by the levers 230 and 231. The angle iron 175 is placed upon the ends of angle irons 97 and 98 and the clamp 160 is swung into clamping position to securely fasten the flange 173 against the face of the turntable 36, as shown in Fig. 8. The angle irons 146 and 261 are successively held in their respective positions as shown in Fig. 8, and the levers 252 and 255 are rotated to force these angle irons against the face of the turntable 36. Next, the angle iron 176 is secured to the turntable 36 by the clamp 161 with the flange 174 positioned between the pins 177—177.

The angle iron 99 is placed upon the angle iron 176 and the end frame 197 with one end of the downwardly extending flange thereof positioned between the frame 197 and the stop 193. Likewise, the angle iron 100 is placed with one end thereof on the angle iron 176 and the other end thereof on the frame 197 with the flange of the latter end positioned between the stop 192 and the frame 197. The pivoted clamps 199 and 200 are swung to their clamping positions, as illustrated by clamp 199 in Fig. 5. The eccentric cams 220 and 227 are rotated to bear against the angle irons 99 and 100, respectively, and thereby firmly secure the end frame 197 between the angle irons 97 and 99, and 98 and 100.

The clamps 120 and 121 are swung to and locked in their clamping positions, as illustrated by the position of the clamp 120 in Fig. 8 and the levers 135 and 148 are actuated to force the upper ends of the outwardly projecting flange 145 and a similar outwardly projecting flange 270 tightly against the face of the turntable 36. The clamps 149 and 150 are swung to and locked in place by the levers 155 and 159 to force the lower ends of the flanges 145 and 270 against the turntable 36.

The cylindrical cam 110 eccentrically mounted on the bolt 111 is then rotated to force the thrust member 104 diagonally upwardly, as viewed in Fig. 8, to cause the fingers 109—109 to engage and force the angle irons 146 and 176 against the angle iron 100 to securely wedge these angle irons between the clamp 120 and the fingers 109—109. During this operation the bolt 115 positioned in the enlarged aperture 116 prevents any large amount of pivotal movement of the thrust member 104 about the cam 110, but allows a limited amount of such movement to permit the thrust member to adjust itself so that both the angle irons 146 and 176 will be thrust laterally against the flanges of the angle iron 100.

The thrust members 105, 106 and 107 are then similarly actuated, and thus the angle irons 146, 175, 176 and 261 will be securely held against the angle irons 97, 98, 99 and 100. The angle irons 97 and 98 also will be pressed tightly against the clamps 149 and 150, respectively, and the stops 91—91 and the angle iron 100 will be pressed firmly against the clamp 121.

The ends of the angle iron 98 are then welded to the end frame 197 and the ends of the angle irons 146 and 175, after which the pins 27 and 60 are withdrawn and the turntables 26 and 36 are rotated 90° counterclockwise as viewed in Fig. 5, and secured in this position by the pins 27 and 60. The angle iron 100 is next welded to the frame 197 and the ends of angle irons 146 and 176. Similarly, the angle irons 99 and 97 can be successively secured in positions suitable for welding and be welded to the end frame 197 and the angle irons against which they are pressed.

After all of the angle irons 97, 98, 99 and 100 have been welded to the frame 197 and the angle irons 146, 175, 176 and 261, the box-like frame created thereby may be removed from the fixture by moving all of the clamps, levers and the like to their unclamping positions and by turning the handle 82 clockwise to slide the turntable 36 to the right, as viewed in Fig. 1, and withdrawing the box-like frame.

The above described embodiment of the invention is very satisfactory for assembling box-like frames in which one of the end frames is not adapted to be preassembled. For assembling box-like frames having both ends thereof preassembled, the thrust members 104, 105, 106 and 107, the clamps 120, 121, the clamps 149 and 150, and the levers 135, 148, 155 and 159 may be removed from the turntable 36. Stop members similar to the stops 191, 192, 193 and 194 may then be bolted to the turntable 36 in positions corresponding to those occupied by the stops 191, 192, 193 and 194 on the turntable 26. Clamps like clamps 199 and 200 positioned on the turntable 26 are bolted in similar positions on the turntable 36. Thus, box-like frames having both end frames preassembled, as is the end frame 197, can be assembled in the fixture. Conversely, if it is desired to assemble box-like frames of a type whose end frames are initially unassembled like the end frame 96, the various clamping means secured to the turntable 26 are removed and counterparts of the clamping means on the turntable 36 are mounted on the turntable 26.

Groups of apertures 275—275 are provided in the turntables 26 and 36 at spaced points thereon for bolting the various securing means on the turntables for assembling box-like frames of sizes and shapes different from that described hereinabove.

By the fixtures described above for holding articles to be assembled, large savings in labor and materials are effected and the articles assembled thereby are uniformly of the exact shape required thereby, which is very necessary. All twisting and misalignment of the various parts welded together to form the completed frames are prevented by these fixtures.

It will be obvious that the embodiment of the invention described above may be varied to provide fixtures for assembling differently shaped articles without departing from the spirit and scope of the invention. Also, the various clamping means may be secured in different positions on the turntables for assembling different sizes of box-like frames.

What is claimed is:

1. An article holding fixture for assembling frame members, which comprises a base, a pair of vertical supports one of which is slidably mounted on the base, a toggle-joint linkage for moving the slidable support and locking it in a predetermined position, a turntable carried by each of the supports, clamping means for securing frame members to the turntables, means for adjusting the position of the toggle-joint linkage to permit the fixture to accommodate frame members of varying sizes, and means for affixing different types of clamping means to the turntables for different frame members.

2. A welding fixture for assembling box-like frame members, which comprises an elongated base, a pair of vertical supports one of which is slidably mounted on the base, a toggle-joint linkage for moving the slidable support and locking it in a predetermined position, an adjustable connecting means between the linkage and the slidable support, turntables rotatably mounted on the supports, locking means to secure the turntables in predetermined positions on the supports, and clamping means for securing frame members to the turntables.

3. A welding fixture for assembling box-like frame members, which comprises a base, a pair of vertical supports one of which is slidably mounted on the base, a toggle-joint linkage for moving the slidable support and locking it in a predetermined position, adjustable connecting means connecting the linkage to the slidable support, turntables rotatably mounted upon the supports, adjustable clamping means for securing frame members of different sizes to the turntables, and means to secure the turntables in predetermined positions on said supports.

4. A welding fixture for assembling box-like frame members, which comprises a base, a pair of turntables, means to mount the turntables on the base in juxtaposed relationship, means secured to one of the turntables for clamping a preassembled end frame of an unassembled box-like frame against that turntable, means secured on the other turntable for clamping the unassembled elements of an end frame against that turntable in assembled relationship, and means for holding side frame members extending between and against the end frame members.

5. A welding fixture for assembling box-like frames, which comprises a base, a pair of turntables, means to mount the turntables on the base so that the turntables face each other, means on each of the turntables for clamping end frames against the turntables, and means on the turntables for clamping side frame members to the end frames.

6. A fixture for assembling angle irons into box-like frames, which comprises a base, a pair of turntables, means to rotatably mount the turntables on the base in facing relationship to each other, means to secure the turntables against rotation in any of a plurality of positions, a plurality of stops secured to the turntables for supporting side angle irons extending between the turntables, means on one of the turntables for clamping a preassembled end frame to the turntable, cam means on the last mentioned turntable for forcing the ends of side angle irons firmly against a preassembled end frame clamped to the turntable and against the stops on that turntable, cam actuated means on the other turntable for clamping angle irons of an unassembled end frame against the turntable, and means cooperating with the stops for clamping the last mentioned angle irons and the side angle irons therebetween.

7. In an article assembling apparatus, a support for an article to be assembled, a clamp movably mounted on the support and having a cam surface thereon, a lever comprising a substantially complete but discontinuous annulus, means for pivotally mounting the lever to the support at a point near one side of the discontinuous portion of the annulus, and a member carried by the annulus near the other side of the discontinuous portion thereof for engaging the cam surface on the clamp to cause the clamp to secure an article to be assembled to the support, the discontinuity in the annulus permitting a yielding pressure to be exerted against the article.

8. In an article assembling apparatus, a base, a fixed article supporting abutment secured to the base, a movable article supporting abutment slidably mounted on the base, a toggle-joint linkage connected to the movable abutment for sliding said abutment on the base, means for adjustably securing said linkage to the base to adjust the relative positions of the fixed and movable abutments, and means for clamping frame members against and between the fixed and the movable abutments.

9. In an article assembling apparatus, a support for an article to be assembled, a clamp movably mounted on the support and having a cam surface thereon, a lever including a substantially complete but discontinuous annulus, means for pivotally mounting the lever with respect to the support, and a member carried by the annulus for engaging the cam surface on the clamp to force the clamp against an article to be assembled.

10. In a fixture for assembling angle irons into box-like frames, a base, a pair of turntables, means for rotatably mounting the turntables on the base in facing relationship to each other, means for securing the turntables against rotation in any of a plurality of positions, means associated with each of the turntables for clamping end frames to the turntables, means for supporting side angle irons extending between the turntables, and means for moving one of the turntables away from the other of the turntables to permit an article assembled to be removed.

11. In an article-assembling apparatus, a base, a fixed abutment secured to the base, a turntable mounted on the abutment, a movable abutment slidably mounted on the base, a second turntable mounted on the movable abutment, a toggle-joint linkage connected to the movable abutment for sliding said abutment on the base, means for adjustably securing the linkage to the base to adjust the relative positions of the fixed and movable abutments, and means for clamping frame members against and between the first-mentioned and second turntables.

CHARLES H. TRIMBLE.

REFERENCES CITED

The following references are of record in the file of this patent:

UNITED STATES PATENTS

| Number | Name | Date |
|---|---|---|
| 1,600,835 | Manley | Sept. 21, 1926 |
| 1,750,521 | Judd | Mar. 11, 1930 |
| 1,487,123 | Severin | Mar. 18, 1924 |
| 1,792,777 | Stahl | Feb. 17, 1931 |
| 2,020,830 | Gray | Nov. 12, 1935 |
| 2,021,893 | Mitchell | Nov. 26, 1935 |
| 1,759,036 | Brantingham | May 20, 1930 |
| 2,041,984 | Vetorino | May 26, 1936 |
| 2,047,190 | Blickman | July 14, 1936 |
| 2,227,688 | Wood | Jan. 7, 1941 |
| 2,165,322 | Weston | July 11, 1939 |
| 2,277,631 | Bullock | Mar. 24, 1942 |